March 7, 1950 N. F. THOMPSON 2,499,613
ELECTRONIC PULSE TIME INTERVAL DISCRIMINATOR
WITH MAXIMUM INTERVAL GATE
Filed May 16, 1946
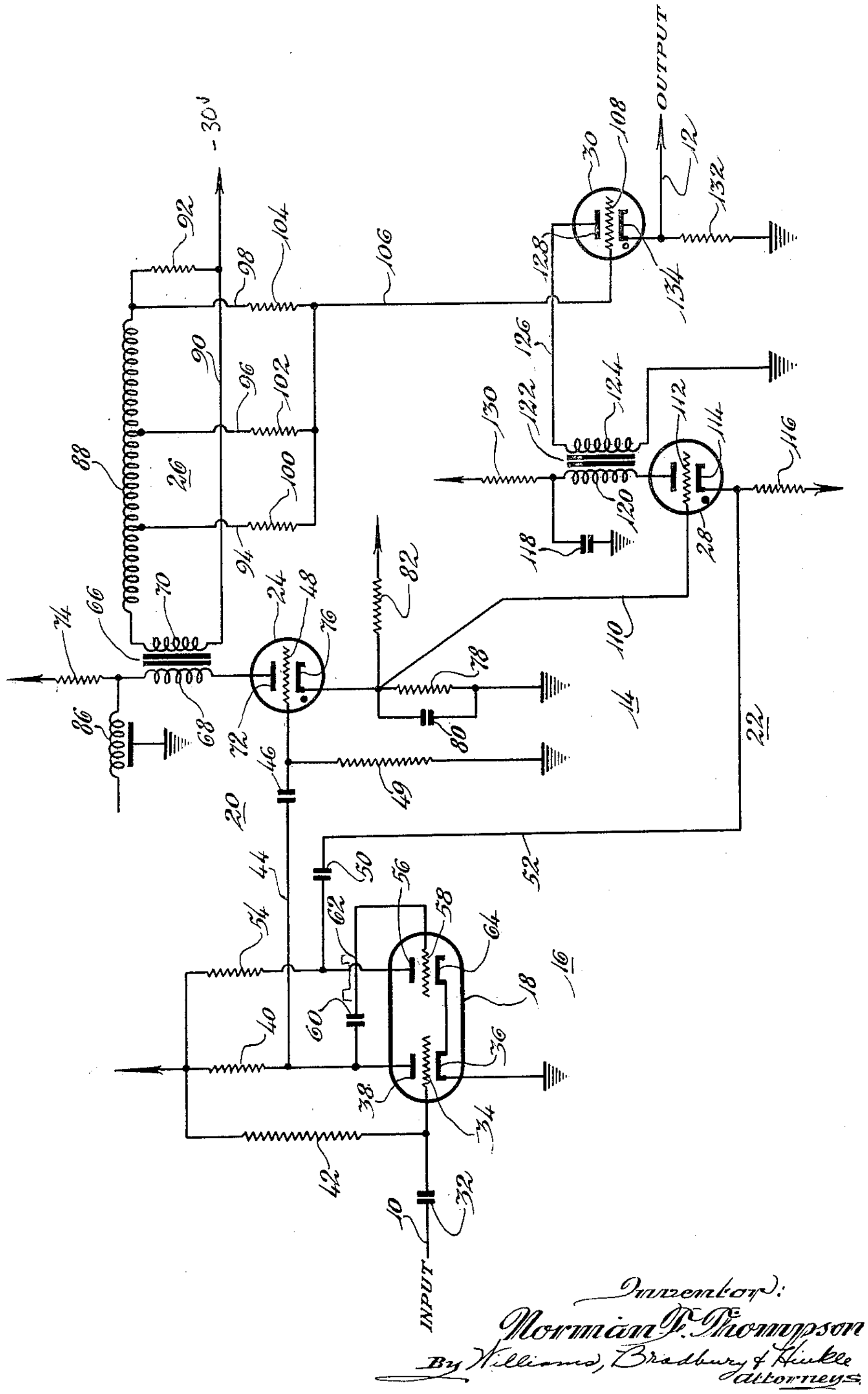
Inventor:
Norman F. Thompson
By Williams, Bradbury & Hinkle
Attorneys.

Patented Mar. 7, 1950 2,499,613

UNITED STATES PATENT OFFICE 2,499,613

ELECTRONIC PULSE TIME INTERVAL DISCRIMINATOR WITH MAXIMUM INTERVAL GATE

Norman F. Thompson, Akron, Ohio, assignor to Stewart-Warner Corporation, Chicago, Ill., a corporation of Virginia Application May 16, 1946, Serial No. 670,069

6 Claims. (Cl. 250—27)

The present invention relates to an electronic control circuit and more particularly to a control circuit providing an output pulse only in the event an electronic control device included in the circuit is supplied with coincident control pulses.

A primary object of the present invention is to provide a new and improved electronic control circuit including a gas tube which is conditioned in response to a first control pulse to become conductive upon the subsequent application thereto of a coincident control pulse.

A further object of the present invention is to provide a new and improved electronic control circuit including a gas tube for supplying a delay circuit with a pulse.

Another object of the present invention is the provision of a new and improved electronic control circuit including a pair of gas tubes, the first for supplying a pulse to a time delay circuit and for conditioning the second gas tube to be rendered conductive within a predetermined time interval thereafter upon the application of coincident control pulses to said second tube.

Other objects and advantages of the present invention will become apparent from the ensuing description of an embodiment of the invention in the course of which reference is had to the accompanying drawing, the single figure of which is a schematic representation of the invention.

The apparatus of the present invention may be utilized in the control of various types of equipment. For example, it may be used in the control of identification equipment in airplanes or other vehicles, which equipment is automatically placed in operation when supplied with a control pulse. This pulse is supplied only when the equipment on the airplane is supplied with input control pulses occurring at predetermined time intervals.

The apparatus on the airplane includes the electronic control illustrated in the drawing. The control comprises an input conductor 10 supplied with pairs of input pulses spaced apart predetermined time intervals. For example, the second pulse of each pair may occur either 3, 5, or 8 microseconds after the first and these pairs are repeated at suitable time intervals. The apparatus includes also an output conductor 12 and a control circuit 14 interconnecting the input and output conductors.

The control circuit includes, in the main, an amplifier and inverter section 16 comprising a tube 18 and a pair of branch circuits 20 and 22, the former of which includes a pulse-former comprising a gas tube 24 and a time delay circuit 26, and the latter of which includes pulse supplying means comprising a gas tube 28. The outputs of the time delay circuit 26 and gas tube 28 are supplied to a mixer tube 30, also a gas tube, which is so controlled that it is rendered conductive only when supplied with coincident pulses from the time delay circuit 26 and tube 28. The use of a gaseous mixer tube is also disclosed and claimed in my copending application, Serial No. 670,068, filed contemporaneously herewith.

The input line 10 is supplied with negative square wave pulses from any suitable source. These pulses may be selectively spaced apart either 3, 5, or 8 microseconds and the paired pulses may be repeated at suitable time intervals. The pulses are supplied through a coupling condenser 32 to the control grid 34 of the first section of tube 18 which may be a double triode of the 6J6 type. The first section includes also a cathode 36 connected to ground and an anode 38 connected to a suitable source of anode voltage (such as 120 volts) through a resistor 40 (as of about 3300 ohms). The grid is supplied with positive bias from the anode voltage supply through a bleeder resistor 42 (as of about 100,000 ohms).

Positive pulses are supplied to branch circuit 20 through conductor 44 and coupling condenser 46 (as of about 100 mf.) leading to the control grid 48 of the tube 24. The conductor 44 is connected to the anode end of resistor 40 and grid 48 is connected to ground through resistor 49 (of about 68,000 ohms).

Inverted, or negative, pulses are supplied to tube 28 through a coupling condenser 50 (of about .002 mf.) and conductor 52, which are connected to the anode end of a resistor 54 (of about 3300 ohms) connecting the anode 56 of the second section of tube 18 to the source of anode potential.

Amplified and inverted pulses are supplied to the grid 58 of the second triode section through a coupling condenser (of about 100 mf.) and conductor 62 connecting the grid to the anode end of resistor 40 of the first triode section. The second section includes also a cathode 64.

The first of the pair of positive pulses applied to the pulse forming tube 24 renders that tube conductive and effective to form a single pulse having a suitable duration as of about 1.5 microseconds which is supplied to the delay circuit 26 through a transformer 66 having a primary winding 68 in the anode circuit of tube 24 and a secondary winding 70 in the time relay circuit. The tube 24, which is preferably of the 884 type, includes an anode 72 connected to a suitable source of anode potential (such as 300 volts) through the primary winding 68 and resistor 74 (as of about 470,000 ohms). The tube includes also a cathode 76 connected to ground through a bias and pulse supplying resistor 78 (as of about 2,200 ohms) shunted by a condenser 80 (as of about .005 mf.). The tube is normally biased to be non-conductive, bias current being supplied through a bleeder resistor 82 (as of about 6,800 ohms) connected to a suitable source of positive voltage (such as 120 volts).

When the tube is rendered conductive in response to the initial pulse of the pair of pulses, a pulse of current flows through the primary winding 68 and the tube, the pulse of current being supplied by a delay line discharge circuit 86. If desired, a capacitor could be used in place of this circuit.

The time delay circuit 26 includes a coil 88, conductor 90 (connected to a negative voltage of about 30 volts), and resistor 92 (as of about 2,000 ohms) connected to the secondary winding 70. Taps 94, 96 and 98 having resistors 100, 102 and 104, (each of about 10,000 ohms) are taken off of the coil 88 in such manner that the pulse supplied to the delay circuit appears at the desired time intervals at the taps. The taps are coupled by conductor 106 to the control grid 108 of the gas tube 30 (which is preferably of the 884 type), thereby supplying the latter with control pulses at the delayed time intervals of 3, 5, and 8 microseconds.

The gas tube 28, which is also preferably of the 884 type, is normally non-conductive and it is conditioned by the first pulse of the pair of pulses to be rendered conductive upon the occurrence of the second pulse. It is so conditioned to become conductive by an increase of the grid potential to a predetermined value for a time interval after the occurrence of the first pulse. The increased potential is obtained as a voltage drop across the resistor 78 in the cathode circuit of tube 24, the cathode end of which is connected by conductor 110 to the grid 112 of tube 28.

The tube 28 is rendered conductive during the time that it is conditioned to be rendered conductive by the application of the second of the control pulses in amplified and inverted form to the cathode 114 of the tube, which is connected to a suitable source of positive voltage (such as 120 volts) through resistor 116 (as of about 15,000 ohms). The application of a more positive potential to the grid along with the application of a more negative potential to the cathode renders the tube conductive. When the tube is rendered conductive, a normally charged capacitor 118 (as of about 25 mf.) is discharged through the tube and the primary winding 120 of a transformer 122 having its secondary winding 124 connected by conductor 126 to the anode 128 of mixer tube 30, thereby to supply a positive voltage pulse to the anode. Suitable anode potential, as from a 300 volt source, is supplied to tube 28 through a resistor 130 (as of about 1 megohm).

The mixer tube 30 is thus simultaneously supplied with a first pulse from the delay circuit rendering the grid 108 more positive when the anode 128 is supplied with a pulse of anode potential through the transformer 122. As a result, current flows through the tube and through a resistor 132 (as of about 2,700 ohms) connected to the cathode 134 of the tube. Such current flow is limited to the duration of the anode pulse and results in the production of a brief pulse across the resistor which is supplied to the apparatus to be controlled through the output conductor 12.

In operation, the amplifier and inverter tube 18 is normally conditioned for operation and the gas tubes 24, 28 and 30 are normally non-conductive. Anode potential is supplied to tubes 24 and 28, and tube 30 is adapted to be supplied with coincident control pulses to its grid and anode. Paired input control pulses are supplied to the input conductor 10, the time spacing between the pulses being some predetermined value as 3, 5 or 8 microseconds. The first of the control pulses is applied as a positive pulse to the grid of tube 24 and as a negative pulse to the cathode of tube 28. The tube 24 is rendered conductive and circuit 86 discharges to supply a first pulse in the primary winding of transformer 66 which pulse is inductively transferred to the delay circuit 26. A second control pulse of generally sawtooth form and having a duration of approximately the longest spacing between the pulses is obtained from across resistor 78 and applied to the grid of tube 28, thereby conditioning the latter to be rendered conductive upon the application of the second inverted pulse to its cathode.

Assuming the spacing between the pulses to be 3 microseconds, then the delayed pulse is applied through conductor 94, resistor 100, and conductor 106 to the grid of the mixer tube three microseconds after the initial pulse. At the same time, the second inverted pulse is applied to the cathode of tube 28 rendering this tube conductive. The condenser 118 is discharged through the tube and the primary winding of transformer 122 with the result that voltage is induced in the secondary winding and applied to the anode 128. Coincidental control pulses are thus applied to the grid and anode of the mixer tube 30 and current flows through it and the resistor 132. The voltage drop across resistor 132 provides an output pulse which is applied to the apparatus to be controlled through the output conductor 12.

It will be apparent to those skilled in the art that various modifications may be made in the details of the illustrative embodiment of the invention described above. It is therefore contemplated that these details are not limitative of the invention except in so far as set forth in the accompanying claims.

Having thus described my invention, what I claim as new and desire to secure by Letters Patent is:

1. Apparatus for producing an output pulse in response to a pair of control pulses, the second of which occurs at a predetermined time interval after the first, including in combination, pulse producing means adapted to produce a pulse upon the application thereto of coincident pulses, first means controlled in response to the first of said pair of control pulses for supplying a series of delayed pulses at spaced time intervals, one interval of which corresponds to the time interval between said pairs of pulses, second means conditioned to be placed in operation for a predetermined time interval by the first of said pair of pulses and rendered operative by the second of said pair of pulses for producing a pulse, and means for supplying the pulses produced by said first and second pulse producing means to said first mentioned pulse producing means.

2. Apparatus for producing an output pulse in response to a pair of control pulses, the second of which occurs at a selected predetermined time interval after the first, including in combination, pulse producing means adapted to produce a pulse upon the application of coincident pulses thereto, means including a gas tube controlled in response to the first of said pair of pulses for supplying a series of delayed pulses at spaced time intervals, one interval of which corresponds to the time interval between said pairs of pulses, and means including said gas tube and a second gas tube controlled by the first tube and conditioned to be rendered conductive by said first tube in response to the first control pulse and rendered conductive by the second pulse of the pair for producing a third pulse coincident with one of the said delayed pulses, and means for supplying said coincident pulses to said pulse producing means.

3. Apparatus for producing an output pulse in response to a pair of control pulses, the second of which occurs at a selected predetermined time interval after the first, including in combination, a gas tube having a pair of control elements, means including a second gas tube controlled in response to the first of said pair of pulses for supplying a series of delayed pulses to one of said elements at spaced time intervals, one of which corresponds to the time interval between said pairs of pulses, and means including said second gas tube and a third gas tube controlled by the second gas tube and conditioned to be rendered conductive by said second gas tube in response to the first control pulse and rendered conductive by the second pulse of the pair for applying a third pulse to the second of said control elements of said first gas tube, coincident with the application of one of the delayed pulses to the first of said elements.

4. Apparatus for producing an output pulse in response to a pair of control pulses, the second of which occurs at a selected predetermined time interval after the first, including in combination, means including a normally non-conductive gas tube having a pair of control elements for supplying an output pulse, means including a second gas tube controlled in response to the first of said pair of pulses for supplying a series of delayed pulses to one of said elements at spaced time intervals and for supplying a single pulse of a duration approximating the duration of said series of pulses, one of said delayed pulses occurring after a time interval corresponding to that between said pairs of pulses, and means including a third gas tube supplied with said single pulse of longer duration and conditioned thereby to be rendered conductive and rendered conductive by the second pulse of the pair for applying a pulse to the second of said elements, coincident with the application of one of said delayed pulses to the first of said elements.

5. Apparatus for producing an output pulse in response to a pair of control pulses, the second of which occurs at a selected predetermined time interval after the first, including in combination, means including a normally non-conductive gas tube having a pair of control elements and a resistor in circuit with said tube for supplying an output pulse, means including a second gas tube controlled in response to the first of said pair of pulses and a delay circuit connected to the output thereof for supplying a series of delayed pulses to one of said control elements at spaced time intervals, one of said delayed pulses occurring after a time interval corresponding to that between said pairs of pulses, means including said second gas tube and a resistor in circuit therewith for supplying a single pulse of a duration approximating the duration of said series of pulses, and means including a third gas tube having an electrode supplied with said single pulse and conditioned thereby to be rendered conductive and having another electrode supplied with said pairs of pulses and rendered conductive by the second pulse of the pair for applying a pulse to the second of said control elements coincident with the application of the delayed pulse to the first of said control elements.

6. Apparatus for producing a pulse in response to a pair of input pulses, the second of which occurs at a selected predetermined time interval after the first, including in combination, a normally non-conductive gas tube having an anode, cathode and control electrode, a resistor connected in series with the cathode, an output conductor connected to the cathode end of said resistor, and means for supplying said tube with coincident pulses at one of said predetermined time intervals after the occurrence of the first of the pair of input control pulses for rendering said tube conductive, said last mentioned means including a second gas tube having an anode, cathode and control electrode, a transformer in the anode circuit of said tube having a primary winding connected to the anode of said second tube and a secondary winding connected to the anode of said first tube, a normally charged condenser connected to the primary winding of said transformer, means including an amplifier for supplying the cathode of said second tube with non-delayed pulses corresponding to said input control pulses, a third gas tube having an anode, cathode and control electrode, means including a resistor in the cathode circuit of said third tube connected to the control electrode of said second tube for conditioning said second tube to be rendered conductive for a predetermined time interval, whereby said second tube is rendered conductive upon the application of the second non-delayed pulse to its cathode, means including an amplifier for supplying the control electrode of said third gas tube with control pulses, means including an energy storing circuit connected to the anode of said third gas tube for producing a pulse of current through said tube and through said resistor, and means including a time delay circuit coupled to the output of said third gas tube and connected to the control electrode of said first gas tube for supplying said control electrode of said first gas tube with pulses at the selected time intervals, whereby said third gas tube is rendered conductive upon the application of coincident pulses to its grid and anode through said time delay circuit and said second gas tube and transformer.

NORMAN F. THOMPSON.

REFERENCES CITED

The following references are of record in the file of this patent:

UNITED STATES PATENTS

| Number | Name | Date |
|---|---|---|
| 2,141,343 | Campbell | Dec. 27, 1938 |
| 2,199,634 | Koch | May 7, 1940 |
| 2,217,957 | Lewis | Oct. 15, 1940 |
| 2,288,554 | Smith, Jr. | June 30, 1942 |
| 2,329,137 | Richards | Sept. 7, 1943 |
| 2,412,994 | Lehmann | Dec. 24, 1946 |
| 2,415,093 | Gerwin | Feb. 4, 1947 |
| 2,415,359 | Loughlin | Feb. 4, 1947 |
| 2,405 855 | Skellett | Feb. 18, 1947 |
| 2,446,802 | Bell, Jr. | Aug. 10, 1948 |

FOREIGN PATENTS

| Number | Country | Date |
|---|---|---|
| 528,192 | Great Britain | Oct. 24, 1940 |